United States Patent Office 3,471,282
Patented Oct. 7, 1969

3,471,282
HERBICIDAL COMPOSITIONS CONTAINING
POLY URACILS
Thomas G. Kugele, Cincinnati, Ohio, assignor to E. I.
du Pont de Nemours and Company, Wilmington, Del.,
a corporation of Delaware
No Drawing. Continuation-in-part of application Ser. No.
622,469, Mar. 13, 1967. This application July 12, 1968,
Ser. No. 744,309
Int. Cl. A01n 9/22; C07d 5/30
U.S. Cl. 71—92                  10 Claims

ABSTRACT OF THE DISCLOSURE

Poly uracils of the formula below are useful in herbicidal compositions:

(1)
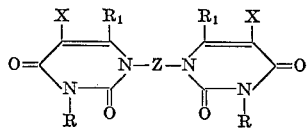

where the compounds may be symmetrical or unsymmetrical and R is alkyl of 3 to 8 carbons, phenyl, benzyl, cycloalkyl of 5 to 8 carbons, or cycloalkyl of 5 to 8 carbons substituted with methyl or methoxy; $R_1$ is alkyl of 1 to 3 carbons; X is methyl, chlorine, bromine and iodine and can be hydrogen when R is cycloalkyl, with the proviso that X and $R_1$ can form a trimethylene or tetramethylene bridge; and Z is

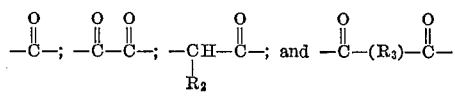

where $R_2$ is hydrogen or alkyl of 1 to 4 carbons and $R_3$ is alkylene of 1 to 12 carbons, alkenylene of 1 to 12 carbons, cyclohexylene, and phenylene.

CROSS REFERENCE TO RELATED APPLICATIONS

This application is a continuation-in-part of my copending application Ser. No. 622,469, filed Mar. 13, 1967, now abandoned, which application is a continuation-in-part application of my then copending application Ser. No. 539,673, filed Apr. 4, 1966, now abandoned.

BRIEF SUMMARY OF THE INVENTION

This invention relates to novel compounds, which for the sake of simplicity can be called poly uracils, and their use in herbicidal compositions.

The compounds are represented by the following structural formula:

(2)
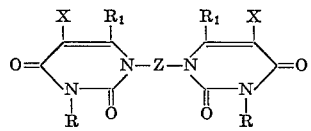

wherein

R can be the same or different at the two positions indicated and is selected from the group consisting of alkyl of 3 to 8 carbon atoms, phenyl, benzyl, cycloalkyl of 5 to 8 carbon atoms and substituted cycloalkyl of 5 to 8 carbon atoms wherein said substituent(s) is selected from the group consisting of methyl and methoxy;

$R_1$ can be the same or different at the two positions indicated and is selected from alkyl of 1 to 3 carbon atoms;

X can be the same or different at the two positions indicated and is selected from the group consisting of methyl, chlorine, bromine, and iodine; and can be hydrogen provided the R on the same ring is cycloalkyl, and with the further proviso that X can be joined with $R_1$ to form a trimethylene or tetramethylene bridge; and Z is selected from the group consisting of:

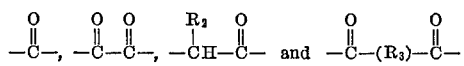

where $R_2$ is hydrogen or alkyl of 1 to 4 carbon atoms and $R_3$ is a divalent radical selected from alkylene of 1 through 12 carbon atoms, alkenylene of 1 through 12 carbon atoms, cyclohexylene and phenylene.

Preferred compounds within the above formula are those where R, $R_1$, and X are the same as above, however the compound is symmetrical and Z is

Exemplary of the preferred compounds are the following:

1,1′-oxalylbis(3-sec-butyl-5-bromo-6-methyluracil)
1,1′-oxalylbis(3-iso-propyl-5-bromo-6-methyluracil)
1,1′-oxalylbis(3-iso-propyl-5-chloro-6-methyluracil)
1,1′-oxalylbis(3-tert-butyl-5-chloro-6-methyluracil)
1,1′-oxalylbis[(3-cyclohexyl-6,7-dihydro-5-cyclopenta(d)pyrimidine-2,4-(1H,3H)-dione]
1,1′-oxalylbis(3-tert-butyl-5-bromo-6-methyluracil)

There is the possibility that the Z-linkage occurs through the 2-positioned oxygens rather than through the 1-positioned nitrogens as shown in the formula above since uracils may react in their enol or keto form as:

(3)
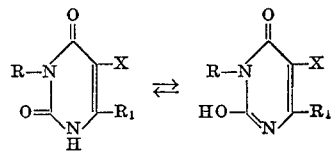

Absorption spectral evidence (infra-red) for the Z-oxygen linkage is strongly suggested by the products of this invention where Z is derived from phosgene

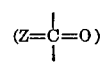

Thus both products (Z-nitrogen or Z-oxygen linkage) or mixtures of these linkages are considered within the scope of this invention. For the sake of clarity or brevity however, the compounds will be named assuming the reaction to have occurred on the 1-nitrogen.

The above compounds are useful in herbicidal compositions. These compositions are mainly useful as soil sterilants but are also useful as selective herbicidal agents in certain crops.

DETAILED DESCRIPTION OF THE INVENTION

The compounds can be prepared by treating two equivalents of the sodio derivative of an appropriately substituted uracil with one equivalent of a bifunctional acid chloride as illustrated by the following reaction (4):

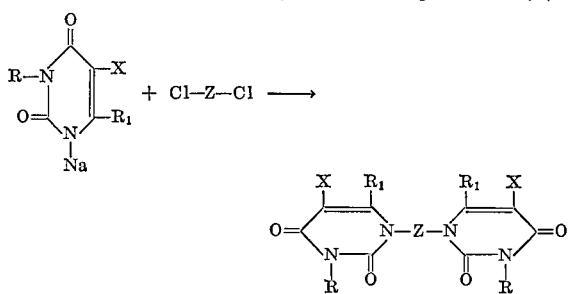

where R, $R_1$, X and Z are as defined above.

Alternatively, these compounds can be prepared by the reaction of a 1-(ω-halooxygenatedhydrocarbo)uracil with the sodio derivative of a second uracil, in which R, $R_1$ and X are not necessarily the same for the two uracil rings coupled together. This reaction (5) is illustrated by the following equations:

Step 1

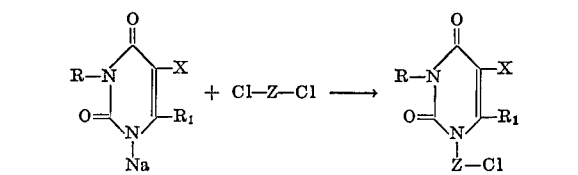

step 2

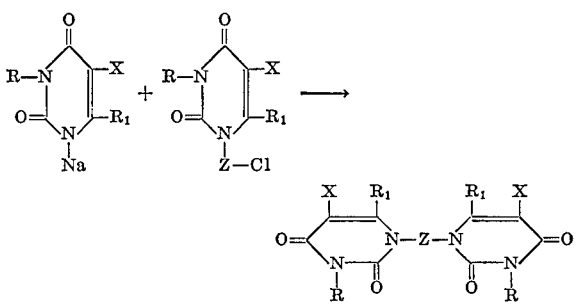

in which R, $R_1$, X and Z are as defined above but where R, $R_1$ and X for the sodio derivative of the substituted uracil added in Step 2 can be different from the R, $R_1$ and X for the sodio derivative of the substituted uracil employed in Step 1.

Reaction (4) is performed in the presence of any of several inert solvent, such as tetrahydrofuran, dioxane, dimethylformamide, chloroform or benzene to facilitate mixing of the reactants. The mixture of 2 molar equivalents of the sodio derivatives of a uracil and one equivalent of a bifunctional acid chloride is stirred from 2 to 24 hours at temperatures from 20° to 75° C. The product can be isolated in any of several ways, such as (1) filtration, followed by a water wash to remove inorganics leaving behind essentially pure product; (2) vacuum stripping of the solvent, followed by treatment with base to remove uncoupled uracil, filtration and water wash as above. Purification, if necessary, is accomplished by recrystallization from common organic solvents or by chemical extraction.

The first step of reaction (5) is performed in the presence of any of several inert solvents, such as tetrahydrofuran, dioxane, dimethylformamide, chloroform or benzene to facilitate mixing of the reactants. The mixture of bifunctional acid chloride, one equivalent of a sodio derivative of an appropriately substituted uracil is stirred for ½ to 24 hours at temperatures of from 0° to 75° C. To the above stirred mixture of 1-(ω-halooxygenatedhydrocarbo) uracil is added a second equivalent of an appropriately substituted uracil.

The second step of reaction (5) involves stirring for from 2 to 24 hours at temperatures of from 20° to 75° C. Product isolation can be performed as described for reaction (4).

In order to more fully describe this invention the following additional examples are given. All parts are parts by weight unless otherwise indicated.

EXAMPLE 1

1,1'-carbonylbis(5-bromo-3-sec-butyl-6-methyluracil)

A total of 28 parts of 5-bromo-3-sec-butyl-6-methyluracil sodio derivative is suspended in 200 parts of tetrahydrofuran. Slowly with stirring 5 parts of phosgene are added. The temperature is allowed to rise autogenetically, then the reaction is stirred at room temperature for 16 hours. The solvent is removed under reduced pressure and the residue treated at 0° with 4 parts of sodium hydroxide contained in 100 parts of water. The solid is filtered, washed with water and dried and is essentially pure 1,1' - carbonylbis(5 - bromo-3-sec-butyl-6-methyluracil), M.P. 220°.

EXAMPLE 2

1,1'-oxalylbis(3-tert-butyl-5-chloro-6-methyluracil)

Two hundred parts of anhydrous tetrahydrofuran is placed in a 3-neck flask equipped with a stirrer, condenser and an addition funnel. Four and two tenths parts of a 60% suspension of sodium hydride (in mineral oil) is charged into the stirring flask followed by 21.6 parts of 3-tert-butyl-5-chloro - 6 - methyluracil. This mixture is stirred at ambient temperature for 16 hours.

Oxalyl chloride, 6.3 parts is added drop-wise to the above vigorously stirred mixture. Stirring is continued for an additional four hours, then the reaction mixture is poured into 2000 parts of cold 2% aqueous sodium hydroxide solution. The precipitated solids collected by filtration, washed with water then recrystallized from ethanol gave essentially pure 1,1'-oxalylbis(3-tert-butyl-5-chloro-6-methyluracil), M.P. 172–172.5° C.

EXAMPLE 3

The following products can be prepared by substituting the appropriate amounts of the following uracil sodio derivatives and polyfunctional acid chlorides for 5-bromo-3-sec-butyl-6-methyluracil sodium salt and phosgene cited in Example 1 or the 3-tert-butyl-5-chloro-6-methyluracil sodium salt and oxalyl chloride of Example 2.

| Substituted uracil sodio derivatives | Polyfunctional acid chloride | 1,1'-oxohydrocarbobis(substituted uracil) |
|---|---|---|
| 3-sec-butyl-5-bromo-6-methyluracil sodio salt | Oxalyl chloride | 1,1'-oxalylbis(3-sec-butyl-5-bromo-6-methyluracil). |
| Do | Malonyl dichloride | 1,1'-malonylbis(3-sec-butyl-5-bromo-6-methyluracil). |
| Do | Succinyl dichloride | 1,1'-succinylbis(3-sec-butyl-5-bromo-6-methyluracil). |
| Do | Adipoyl dichloride | 1,1'-adipoylbis(3-sec-butyl-5-bromo-6-methyluracil). |
| Do | Sebacyl dichloride | 1,1'-sebacylbis(3-sec-butyl-5-bromo-6-methyluracil). |
| Do | Phthalyl dichloride | 1,1'-phthalylbis(3-sec-butyl-5-bromo-6-methyluracil). |
| Do | Isophthalyl dichloride | 1,1'-isophthalylbis(3-sec-butyl-5-bromo-6-methyluracil). |
| Do | Terephthalyl dichloride | 1,1'-terephthalylbis(3-sec-butyl-5-bromo-6-methyluracil). |
| Do | Perhydrophthalyl dichloride | 1,1'-perhydrophthalylbis(3-sec-butyl-5-bromo-6-methyluracil). |
| Do | Perhydroisophthalyl dichloride | 1,1'-perhydroisophthalylbis(3-sec-butyl-5-bromo-6-methyluracil). |
| Do | Perhydroterephthalyl dichloride | 1,1'-perhydroterephthalylbis(3-sec-butyl-5-bromo-6-methyluracil). |
| Do | Fumaryl chloride | 1,1'-fumarylbis(3-sec-butyl-5-bromo-6-methyluracil). |
| 3-sec-butyl-5-chloro-6-methyluracil sodio salt | Oxalyl chloride | 1,1'-oxalylbis(3-sec-butyl-5-chloro-6-methyluracil). |
| 3-tert-butyl-5-chloro-6-ethyluracil sodio salt | do | 1,1'-oxalylbis(3-tert-butyl-5-chloro-6-ethyluracil). |

| Substituted uracil sodio derivatives | Polyfunctional acid chloride | 1,1'-oxohydrocarbobis(substituted uracil) |
|---|---|---|
| 3-(iso-propyl)-5-bromo-6-methyluracil sodio salt | do | 1,1'-oxalylbis[3-(iso-propyl)-5-bromo-6-methyluracil]. |
| 3-sec-butyl-5-chloro-6-ethyluracil sodio salt | do | 1,1'-oxalylbis(3-sec-butyl-5-chloro-6-ethyluracil). |
| 3-tert-butyl-5-bromo-6-n-propyluracil sodio salt | Phosgene | 1,1'-carbonylbis(3-tert-butyl-5-bromo-6-n-propyluracil). |
| 3-iso-propyl-5-iodo-6-iso-propyluracil sodio salt | Malonyl dichloride | 1,1'-malonylbis(3-iso-propyl-5-iodo-6-iso-propyluracil). |
| 3-(3-pentyl)-5-bromo-6-methyluracil sodio salt | Oxalyl chloride | 1,1'-oxalylbis[3-(3-pentyl)-5-bromo-6-methyluracil]. |
| 3-n-butyl-5,6-dimethyluracil sodio salt | Fumaryl chloride | 1,1'-fumarylbis(3-n-butyl-5,6-dimethyluracil). |
| 3-(n-hexyl)-5-chloro-6-ethyluracil sodio salt | Phthalyl dichloride | 1,1'-phthalylbis(3-n-hexyl-5-chloro-6-ethyluracil). |
| 3-(tert-octyl)-5-iodo-6-ethyluracil sodio salt | Fumaryl chloride | 1,1'-fumarylbis(3-tert-octyl-5-iodo-6-ethyluracil). |
| 3-n-propyl-5-methyl-6-ethyluracil sodio salt | 1,2,3,6 tetrahydrophthalyl dichloride | 1,1'-1,2,3,6-tetrahydrophthalylbis(3-n-propyl-5-methyl-6-ethyluracil). |
| 3-(3-pentyl)-5-chloro-6-methyluracil sodio salt | Oxalyl chloride | 1,1'-oxalylbis[3-(3-pentyl)-5-chloro-6-methyluracil]. |
| 3-sec-butyl-5-iodo-6-methyluracil sodio salt | Succinyl dichloride | 1,1'-succinylbis(3-sec-butyl-5-iodo-6-methyluracil). |
| 3-phenyl-5-bromo-6-methyl-uraci sodio salt | Phosgene | 1,1'-carbonylbis(3-phenyl-5-bromo-6-methyluracil). |
| 3-benzyl-5-bromo-6-methyluracil sodio salt | Itaconyl dichloride | 1,1'-itaconylbis(3-benzyl-5-bromo-6-methyluracil). |
| 3-phenyl-5-chloro-6-ethyluracil sodio salt | Sebacyl dichloride | 1,1'-sebacylbis(3-phenyl-5-chloro-6-ethyluracil). |
| 3-cyclopentyl-5-chloro-6-methyluracil sodio salt | Glutaconyl dichloride | 1,1'-glutaconylbis(3-cyclopentyl-5-chloro-6-methyluracil). |
| 3-cyclohexyl-5-bromo-6-methyluracil sodio salt | Phosgene | 1,1'-carbonylbis(3-cyclohexyl-5-bromo-6-methyluracil). |
| 3-cycloheptyl-5-bromo-6-methyluracil sodio salt | Perhydroterephthalyl dichloride | 1,1'-perhydroterephthalylbis(3-cycloheptyl-5-bromo-6-methyluracil). |
| 3-cyclooctyl-5-methyl-6-n-propyluracil sodio salt | Succinyl dichloride | 1,1'-succinylbis(3-cyclooctyl-5-methyl-6-n-propyluracil). |
| 3-(2-methylcyclohexyl)-5-bromo-6-ethyluracil sodio salt. | Phosgene | 1,1'-carbonylbis[3-(2-methylcyclohexyl)-5-bromo-6-ethyluracil]. |
| 3-(2-methoxycyclohexyl)-5-iodo-6-methyluracil sodio salt. | Oxalyl chloride | 1,1'-oxalylbis[3-(2-methoxycyclohexyl)-5-iodo-6-methyluracil]. |
| 3-cyclohexyl-6-methyluracil sodio salt | Phosgene | 1,1'-carbonylbis(3-cyclohexyl-6-methyluracil). |
| 3-cyclooctyl-6-ethyluracil sodio salt | Oxalyl chloride | 1,1'-oxalylbis(3-cyclooctyl-6-ethyluracil). |
| 3-cyclopentyl-6-ethyluracil sodio salt | Malonyl dichloride | 1,1'-malonylbis(3-cyclopentyl-6-ethyluracil). |
| 3-(2-methylcyclohexyl)-6-methyluracil sodio salt | Isophthalyl dichloride | 1,1'-isophthalylbis[3-(2-methylcyclohexyl)-6-methyluracil]. |
| 3-(3-methoxycyclohexyl)-6-ethyluracil sodio salt | Oxalyl chloride | 1,1'-oxalylbis[3-(3-methoxycyclohexyl)-6-ethyluracil]. |
| 3-sec-butyl-5-methyl-6-isopropyluracil sodio salt | Succinyl dichloride | 1,1'-succinylbis(3-sec-butyl-5-methyl-6-iso-propyluracil). |
| 3-(2-methylcyclohexyl)-5,6,7,8-tetrahydro-2,4-(1H,3H)-quinazolinedione sodio salt. | Phosgene | 1,1'-carbonylbis[3-(2-methylcyclohexyl)-5,6,7,8-tetrahydro-2,4-(1H,3H)-quinazolinedione]. |
| 3-cyclohexyl-6,7-dihydro[3-cyclopenta[d]pyrimidine-2,4-[1H,3H]-dione sodio salt. | do | 1,1'-carbonylbis[3-cyclohexyl-6,7-dihydro-5-cyclopenta(d)pyrimidine-2,4-(1H,3H)-dione]. |
| 3-tert-butyl-5,6,7,8-tetrahydro-2,4-[1H,3H]-quinazolinedione sodio salt. | Oxalyl chloride | 1,1'-oxalylbis[3-tert-butyl-5,6,7,8-tetrahydro-2,4-(1H,3H)-quinazolinedione]. |
| 3-iso-propyl-5,6,7,8-tetrahydro-2,4-[1H,3H]-quinazolinedione sodio salt. | Malonyl dichloride | 1,1'-malonylbis[3-iso-propyl-5,6,7,8-tetrahydro-2,4-(1H,3H)-quinazolinedione]. |
| 3-phenyl-5,6,7,8-tetrahydro-2,4-[1H,3H]-quinazolinedione sodio salt. | Phthalyl dichloride | 1,1'-phthalylbis[3-phenyl-5,6,7,8-tetrahydro-2,4-(1H,3H)-quinazolinedione]. |
| 3-sec-butyl-5,6,7,8-tetrahydro-2,4-[1H,3H]-quinazolinedione sodio salt. | Phosgene | 1,1'-carbonylbis[3-sec-butyl-5,6,7,8-tetrahydro-2,4-(1H,3H)-quinazolinedione]. |
| 3-cyclooctyl-5,6,7,8-tetrahydro-2,4-[1H,3H]-quinazolinedione sodio salt. | Adipoyl dichloride | 1,1'-adipoylbis[3-cyclooctyl-5,6,7,8-tetrahydro-2,4-(1H,3H)-quinazolinedione]. |
| 3-sec-butyl-6,7-dihydro-5-cyclopenta[d]pyrimidine-2,4-[1H,3H]-dione sodio salt. | Oxalyl chloride | 1,1'-oxalylbis[3-sec-butyl-6,7-dihydro-5-cyclopenta(d)pyrimidine-2,4-(1H,3H)-dione]. |
| 3-iso-propyl-6,7-dihydro-5-cyclopenta[d]pyrimidine-2,4-[1H,3H]-dione sodio salt. | Citraconyl dichloride | 1,1'-citraconylbis[3-iso-propyl-6,7-dihydro-5-cyclopenta(d)pyrimidine-2,4-(1H,3H)-dione]. |
| 3-cyclohexyl-6,7-dihydro-5-cyclopenta[d]pyrimidine-2,4-[1H,3H]-dione sodio salt. | Oxalyl chloride | 1,1'-oxalylbis[3-cyclohexyl-6,7-dihydro-5-cyclopenta(d)pyrimidine-2,4-(1H,3H)-dione]. |
| 3-(pentyl)-6,7-dihydro-5-cyclopenta[d]pyrimidine-2,4-[1H,3H]-dione sodio salt. | Phosgene | 1,1'-carbonylbis[3-(3-pentyl)-6,7-dihydro-5-cyclopenta(d)pyrimidine-2,4-(1H,3H)-dione]. |
| 3-sec-butyl-5-iodo-6-methyluracil sodio salt | do | 1,1'-carbonylbis(3-sec-butyl-5-iodo-6-methyluracil). |
| 3-tert-butyl-5-chloro-6-methyluracil sodio salt | do | 1,1'-carbonylbis(3-tert-butyl-5-chloro-6-methyluracil). |
| 3-tert-butyl-5-bromo-6-methyluracil sodio salt | Oxalyl chloride | 1,1'-oxalylbis(3-tert-butyl-5-bromo-6-methyluracil). |
| 3-(2-pentyl)-5-bromo-6-methyluracil sodio salt | do | 1,1'-oxalylbis[3-(2-pentyl)-5-bromo-6-methyluracil]. |
| 3-sec-butyl-5-chloro-6-ethyluracil sodio salt | Phosgene | 1,1'-carbonylbis(3-sec-butyl-5-chloro-6-ethyluracil). |
| 3-tert-butyl-5-bromo-6-n-propyluracil sodio salt | Malonyl dichloride | 1,1'-malonylbis(3-tert-butyl-5-bromo-6-n-propyluracil). |
| 3-iso-propyl-5-iodo-6-iso-propyluracil sodio salt | Oxalyl chloride | 1,1'-oxalylbis(3-iso-propyl-5-iodo-6-iso-propyluracil). |
| 3-(3-pentyl)-5-bromo-6-methyluracil sodio salt | Phosgene | 1,1'-carbonylbis[3-(3-pentyl)-5-bromo-6-methyluracil]. |
| 3-n-butyl-5,6-dimethyluracil sodio salt | Glutaryl dichloride | 1,1'-glutarylbis(3-n-butyl-5,6-dimethyluracil). |
| 3-(n-hexyl)-5-chloro-6-ethyluracil sodio salt | Suberyl dichloride | 1,1'-suberylbis(3-n-hexyl-5-chloro-6-ethyluracil). |
| 3-(tert-octyl)-5-iodo-6-ethyluracil sodio salt | Azelayl dichloride | 1,1'-azelaylbis(3-tert-octyl-5-iodo-6-ethyluracil). |
| 3-n-propyl-5-methyl-6-ethyluracil sodio salt | Pimelyl dichloride | 1,1'-pimelylbis(3-n-propyl-5-methyl-6-ethyluracil). |
| 3-tert-butyl-5-chloro-6-ethyluracil sodio salt | Phosgene | 1,1'-carbonylbis(3-tert-butyl-5-chloro-6-ethyluracil). |
| 3-(3-pentyl)-5-chloro-6-methyluracil sodio salt | do | 1,1'-carbonylbis[3-(3-pentyl)-5-chloro-6-methyluracil]. |
| 3-sec-butyl-5-iodo-6-methyluracil sodio salt | do | 1,1'-carbonylbis(3-sec-butyl-5-iodo-6-methyluracil). |
| 3-phenyl-5-bromo-6-methyluracil sodio salt | do | 1,1'-carbonylbis(3-phenyl-5-bromo-6-methyluracil). |
| 3-benzyl-5-bromo-6-methyluracil sodio salt | Oxalyl chloride | 1,1'-oxalylbis(3-benzyl-5-bromo-6-methyluracil). |
| 3-phenyl-5-chloro-6-ethyluracil sodio salt | do | 1,1'-oxalylbis(3-phenyl-5-chloro-6-ethyluracil). |
| 3-cyclopentyl-5-chloro-6-methyluracil sodio salt | do | 1,1'-oxalylbis(3-cyclopentyl-5-chloro-6-methyluracil). |
| 3-cyclohexyl-5-bromo-6-methyluracil sodio salt | do | 1,1'-oxalylbis(3-cyclohexyl-5-bromo-6-methyluracil). |
| 3-cycloheptyl-5-bromo-6-methyluracil sodio salt | Phosgene | 1,1'-carbonylbis(3-cycloheptyl-5-bromo-6-methyluracil). |
| 3-cyclooctyl-5-methyl-6-n-propyluracil sodio salt | do | 1,1'-carbonylbis(3-cyclooctyl-5-methyl-6-n-propyluracil). |
| 3-(2-methylcyclohexyl)-5-bromo-6-ethyluracil sodio salt. | Oxalyl chloride | 1,1'-oxalylbis[3-(2-methylcyclohexyl)-5-bromo-6-ethyluracil]. |
| 3-(2-methoxycyclohexyl)-5-iodo-6-methyluracil sodio salt. | Phosgene | 1,1'-carbonylbis[3-(2-methoxycyclohexyl)-5-iodo-6-methyluracil]. |
| 3-(3-methylcyclohexyl)-5-chloro-6-methyluracil sodio salt. | Malonyl dichloride | 1,1'-malonylbis[3-(3-methylcyclohexyl)-5-chloro-6-methyluracil]. |
| 3-cyclohexyl-6-methyluracil sodio salt | Pimelyl dichloride | 1,1'-pimelylbis(3-cyclohexyl-6-methyluracil). |
| 3-cyclooctyl-6-ethyluracil sodio salt | Succinyl dichloride | 1,1'-succinylbis(3-cyclooctyl-6-ethyluracil). |
| 3-cyclopentyl-6-ethyluracil sodio salt | Phthalyl dichloride | 1,1'-phthalylbis(3-cyclopentyl-6-ethyluracil). |
| 3-(2-methylcyclohexyl)-6-methyluracil sodio salt | Phosgene | 1,1'-carbonylbis[3-(2-methylcyclohexyl)-6-methyluracil]. |
| 3-(3-methoxycyclohexyl)-6-ethyluracil sodio salt | do | 1,1'-carbonylbis[3-(3-methoxycyclohexyl)-6-ethyluracil]. |
| 3-sec-butyl-5-methyl-6-iso-propyluracil sodio salt | do | 1,1'-carbonylbis(3-sec-butyl-5-methyl-6-iso-propyluracil). |
| 3-(2-methylcyclohexyl)-5,6,7,8-tetrahydro-2,4-[1H,3H]-quinazolinedione sodio salt. | Oxalyl chloride | 1,1'-oxalylbis[3-(2-methylcyclohexyl)-5,6,7,8-tetrahydro-2,4-(1H,3H)-quinazolinedione]. |
| 3-cyclohexyl-6,7-dihydro-5-cyclopenta[d]pyrimidine-2,4-[1H,3H]-dione sodio salt. | Sebacyl dichloride | 1,1'-sebacylbis[3-cyclohexyl-6,7-dihydro-5-cyclopenta(d)pyrimidine-2,4-(1H,3H)-dione]. |
| 3-tert-butyl-5,6,7,8-tetra-hydro-2,4-[1H,3H]-quinazolinedione sodio salt. | 3,3-dimethylglutaryl dichloride | 1,1'-(3,3-dimethylglutaryl)bis[3-tert-butyl-5,6,7,8-tetrahydro-2,4-(1H,3H)-quinazolinedione]. |

| Substituted uracil sodio derivatives | Polyfunctional acid chloride | 1,1'-oxohydrocarbobis(substituted uracil) |
|---|---|---|
| 3-iso-propyl-5,6,7,8-tetrahydro-2,4-[1H,3H]-quinazolinedione sodio salt. | Phosgene | 1,1'-carbonylbis[3-iso-propyl-5,6,7,8-tetrahydro-2,4-(1H,3H)-quinazolinedione]. |
| 3-phenyl-5,6,7,8-tetrahydro-2,4-[1H-3H]-quinazolinedione sodio salt. | do | 1,1'-carbonylbis[3-phenyl-5,6,7,8-tetrahydro-2,4-(1H,3H)-quinazoline-dione]. |
| 3-sec-butyl-5,6,7,8-tetrahydro-2,4-[1H,3H]-quinazolinedione sodio salt. | Isophthalyl dichloride | 1,1-isophthalylbis[3-sec-butyl-5,6,7,8-tetrahydro-2,4-(1H-3H)-quinazolinedione]. |
| 3-cyclooctyl-5,6,7,8-tetrahydro-2,4-[1H,3H]-quinazolinedione sodio salt. | Oxalyl chloride | 1,1'-oxalylbis[3-cyclooctyl-5,6,7,8-tetrahydro-2,4-(1H,3H)-quinazolinedione]. |
| 3-sec-butyl-6,7-dihydro-5-cyclopenta[d]pyrimidine-2,4-[1H,3H]-dione sodio salt. | Phosgene | 1,1'-carbonylbis[3-sec-butyl-6,7-dihydro-5-cyclopenta(d)pyrimidine-2,4-(1H,3H)-dione]. |
| 3-iso-propyl-6,7-dihydro-5-cyclopenta[d]pyrimidine-2,4-[1H,3H]-dione sodio salt. | Perhydroterephthalyl dichloride | 1,1'-perhydroterephthalylbis[3-iso-propyl-6,7-dihydro-5-cyclopenta(d)pyrimidine-2,4-(1H,3H)-dione. |
| 3-benzyl-6,7-dihydro-5-cyclopenta[d]pyrimidine-2,4-[1H,3H]-dione sodio salt. | Phosgene | 1,1'-carbonylbis[3-benzyl-6,7-dihydro-5-cyclopenta-(d)pyrimidine-2,4-(1H,3H)-dione]. |
| 3-(3-pentyl)-6,7-dihydro-5-cyclopenta[d]pyrimidine-2,4-[1H,3H]-dione sodio salt. | Phthalyl dichloride | 1,1'-phthalylbis[3-(3-pentyl)-6-7-dihydro-5-cyclopenta(d)pyrimidine-2,4-(1H,3H)-dione]. |
| 3-sec-butyl-5-iodo-6-methyluracil sodio salt | Oxyalyl chloride | 1,1'-oxalylbis(3-sec-butyl-5-iodo-6-methyluracil). |
| 3-tert-butyl-5-chloro-6-methyluracil sodio salt | do | 1,1'-oxalylbis(3-tert-butyl-5-chloro-6-methyluracil). |
| 3-tert-butyl-5-bromo-6-methyluracil sodio salt | Phosgene | 1,1'-carbonylbis(3-tert-butyl-5-bromo-6-methyluracil). |
| 3-(2-pentyl)-5-bromo-6-methyluracil sodio salt | Traumatyl dichloride | 1,1'-traumatylbis[3-(2-pentyl)-5-bromo-6-methyluracil]. |

EXAMPLE 4

5 - bromo - 3 - sec - butyl-1-(5-bromo-3-tert-butyl-1,2,3,4-tetrahydro - 6 - methyl - 2,4 - dioxo - 1-pyrimidinyl carbonyl)-6-methyluracil A total of 14 parts of 5-bromo-3-sec-butyl-6-methyluracil sodium salt is suspended in 200 parts of tetrahydrofuran and stirred for a short time. Slowly, with stirring, is added 5 parts of phosgene at temperatures between 10° and 0° C., the reaction mixture is then allowed to stir at these temperatures for 24 hours. Slowly, with stirring, is then added 14 parts of 5-bromo-3-tert-butyl-6-methyluracil sodium salt and the temperature is allowed to rise to a temperature not greater than 75°, usually 35° is maximum. This mixture is allowed to stir for 24 hours at 25° C. The solvent is removed at reduced pressure and the residue treated at 0° with 4 parts of sodium hydroxide contained in 100 parts of water. Filtration and water wash yields essentially pure 5-bromo-3-sec-butyl-1-(5-bromo-3-tert - butyl - 1,2,3,4 - tetrahydro - 6 - methyl - 2,4-dioxo-1-pyrimidinyl carbonyl)-6-methyluracil.

EXAMPLE 5

The following products can be prepared by substituting the appropriate amounts of 1-(ω-halooxygenatedhydrocarbo-3,5,6-trisubstituted)uracil for the in situ generated 1-chlorocarbonyl-3-sec-butyl-5-bromo-6-methyluracil and 3-tert-butyl-5-bromo-6-methyluracil sodium salt given in Example 4.

EXAMPLE 6

1,1'-(1-oxoethylene) bis-(5-bromo-3-isopropyl-6-methyluracil)

Two hundred parts of dry tetrahydrofuran is placed in a reactor equipped with an agitator and a reflux condenser. A 60% suspension of sodium hydride (in mineral oil), 4.2 parts is charged into the stirring reactor followed by 24.7 parts of 5-bromo-3-isopropyl-6-methyluracil. This mixture is stirred at ambient temperature for 16 hours.

Chloroacetyl chloride 5.6 parts is added gradually to the above stirring mixture. After the addition is complete, the reaction mixture is stirred an additional 4 hours then poured into 2000 parts of ice-cold 2% aqueous sodium hydroxide solution. The precipitated solid collected by filtration, washed with water until alkali-free is technical grade 1,1'(1-oxoethylene) bis-(5-bromo-3-isopropyl-6-methyluracil) which can be purified by recrystallization from ethanol.

Equivalent amounts of the corresponding reagents (appropriate α-halogenated acid chlorides and uracils) can be substituted for the chloroacetyl chloride and 5-bromo-3-isopropyl-6-methyluracil of the procedure above and the following compounds of this invention can be prepared:

1,1'-(1-oxoethylene) bis-(5-bromo-3-sec-butyl-6-methyluracil)
1,1'-(1-oxo-2-methylethylene) bis-(5-bromo-3-sec-butyl-6-methyluracil)

| 1-(ω-halooxygenated-hydrocarbo-3,5,6-trisubstituted uracil | 3,5,6-trisubstituted uracil, sodio derivatives | Product |
|---|---|---|
| 1-chlorocarbonyl-3-tert-butyl-5-bromo-6-methyluracil | 3-tert-butyl-5-chloro-6-methyluracil sodio salt | 3-tert-butyl-5-chloro-1-(5-bromo-3-tert-butyl-1,2,3,4-tetrahydro-6-methyl-2,4-dioxo-1-pyrimidinyl carbonyl)-6-methyluracil. |
| 1-chlorooxalyl-3-sec-butyl-5-bromo-6-methyluracil | 3-tert-butyl-5-chloro-6-methyluracil sodio salt | 3-tert-butyl-5-chloro-1-(3-sec-butyl-5-bromo-1,2,3,4-tetrahydro-6-methyl-2,4-dioxo-1-pyrimidinyl oxalyl)-6-methyluracil. |
| 1-chlorocarbonyl-3-sec-butyl-5-bromo-6-methyluracil | 3-(2-methylcyclohexyl)-5,6,7,8-tetrahydro-2,4-[1H,3H]-quinazolinedione sodio salt. | 3-(2-methylcyclohexyl)-1-(3-sec-butyl-5-bromo-1,2,3,4-tetrahydro-6-methyl-2,4-dioxo-1-pyrimidinyl carbonyl)-5,6,7,8-tetrahydro-2,4-[1H,3H]-quinazolinedione. |
| 1-chloromalonyl-3-tert-butyl-5-chloro-6-methyluracil | 3-(2-pentyl)-5-bromo-6-methyluracil sodio salt | 3-(2-pentyl)-5-bromo-1-(3-tert-butyl-5-chloro-1,2,3,4-tetrahydro-6-methyl-2,4-dioxo-1-pyrimidinyl malonyl)-6-methyluracil. |
| 1-chlorooxalyl-3-tert-butyl-5-bromo-6-methyluracil | 3-sec-butyl-5-bromo-6-methyluracil sodio salt | 3-sec-butyl-5-bromo-1-(3-tert-butyl-5-bromo-1,2,3,4-tetrahydro-2,4-dioxo-1-pyrimidinyl oxalyl)-6-methyluracil. |
| 1-chlorocarbonyl-3-sec-butyl-5-chloro-6-methyluracil | 3-cyclohexyl-6-methyluracil sodio salt | 3-cyclohexyl-1-(3-sec-butyl-5-chloro-12,3,4-tetrahydro-2,4-dioxo-1-pyrimidinyl carbonyl)-6-methyluracil. |
| 1-chlorocarbonyl-3-phenyl-5-chloro-6-methyluracil | 3-benzyl-5-bromo-6-methyluracil sodio salt | 3-benzyl-5-bromo-1-(3-phenyl-5-chloro-1,2,3,4-tetrahydro-2,4-dioxo-1-pyrimidinyl carbonyl)-6-methyluracil. |

1,1-(1-oxo-2-methylethylene) bis-(5-chloro-3-chlorohexyl-6-methyluracil)

1,1'-(1-oxoethylene) bis-[5-chloro-3-(1-ethylpropyl)-6-methyluracil]

1,1'-(1-oxo-2-methylethylene) bis-(5-chloro-3-tert-butyl-6-methyluracil)

1,1'-(1-oxoethylene) bis-(5-bromo-3-tert-butyl-6-methyluracil)

1,1'-(1-oxoethylene) bis-(5-chloro-3-benzyl-6-methyluracil)

1,1'-(1-oxoethylene) bis-(5-bromo-3-phenyl-6-methyluracil)

1,1'-(1-oxo-2-butylethylene) bis-(5-chloro-3-isopropyl-6-methyluracil)

1,1'-(1-oxo-2-ethylethylene) bis-(5-bromo-3-isopropyl-6-methyluracil)

1,1'-(1-oxo-2-methylethylene) bis-(5-iodo-3-isopropyl-6-methyluracil)

1,1'-(1-oxoethylene) bis-(3-cyclohexyl-6-methyluracil)

1,1'-(1-oxoethylene) bis-(6-methyl-3-norbornyluracil)

1,1'-(1-oxoethylene) bis-(5,6-dimethyl-3-cyclohexyluracil)

1,1'-(1-oxoethylene) bis-[3-cyclohexyl-6,7-dihydro-5-cyclopenta(d)pyrimidine-2,4-(1H,3H)-dione]

The poly uracils of the invention can be admixed with pest control adjuvants or modifiers to provide herbicidal compositions in the form of dusts, granules, pellets, water-dispersible powders, high-strength concentrates, and emulsions and solutions or dispersions in organic liquids.

Thus, the poly uracils can be used with a carrier or diluent agent such as a finely divided solid, an organic liquid, a wetting agent, a dispersing agent, or any suitable combination of these.

Compositions containing the polyuracils, especially liquids and wettable powders, contain as a conditioning agent one or more surface-active agents, sometimes called surfactants, in amounts sufficient to render the composition readily dispersible in water or in oil.

The surface-active agent used can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1965 Annual by John W. McCutcheon, Inc.

In general, less than 10% by weight of the surface-active agent will be used and ordinarily the amount of surface-active agents will range from 1–5% but may even be less than 1% by weight.

Additional surface-active agents can be added to the formulations to increase the ratio of surfactant: poly uracil up to as high as 5:1 by weight. Such compositions have a greater herbicidal effectiveness than can be expected from a consideration of the activity of the components used separately. When used at higher rates it is preferred that the surfactant be present in the range of one-fifth to five parts surfactant for each one part of poly uracil.

Wettable powders are water-dispersible compositions containing the poly uracil, an inert solid extender, and one or more surfactants to provide rapid wetting and prevent heavy flocculation when suspended in water.

The classes of extenders suitable are the natural clays, diatomaceous earths, and synthetic mineral fillers derived from silica and silicates. Most preferred fillers are kaolinites, attapulgite clay, montmorillonite clays, synthetic silicas, synthetic magnesium silicate and calcium sulfate dihydrate.

Wettable powder formulations will contain from about 25 to 90 weight percent poly uracil, from 0.5 to 2.0 weight percent wetting agent, from 0.25 to 5.0 weight percent dispersant, and from 9.25 to 74.25 weight percent inert extender, as these terms are described above.

High-strength compositions generally consist of 90 to 99.5% poly uracil, and 0.5 to 10% of a liquid or solid surfactant such as those described by McCutcheon in "Detergents and Emulsifiers" 1965 Annual. Such high-strength compositions can often be used in a manner similar to the wettable powders but they are also suitable for further formulation.

The organic liquid suspension concentrates are prepared by mixing together and sandgrinding a slurry of oil-insoluble active ingredient in the presence of dispersing agents.

These organic liquid suspension concentrates will contain from 15 to 40% of the poly uracil, from 45 to 70% organic liquid such as kerosene, mineral oil and certain weed oils with the remainder made up of surfactants, corrosion inhibitors, and suspending agents.

Dusts are dense powder compositions which are intended for application in dry form in accordance with the preferred compositions of the invention. Dusts are characterized by their free-flowing and rapid settling properties so that they are not readily windborne to areas where their presence is not desired. They contain primarily an active material and a dense free-flowing, solid extender but may also contain grinding aids and surfactants.

Thus, the dust compositions will comprise about 5 to 20 weight percent poly uracil, 5 to 50 weight percent absorptive clay filler, 0 to 1.0 weight percent wetting agent, and about 30 to 90 weight percent dense, free-flowing dust diluent, as these terms are used herein.

Emulsifiable oils are usually solutions of poly uracil in non-water miscible solvents together with a surfactant.

For the compositions of this invention, emulsifiable oils can be made by mixing the poly uracil with a solvent and surfactant. Suitable solvents for the compounds of this invention are aromatic hydrocarbons including many weed oils, chlorinated solvents, and non-water miscible ethers, esters, or ketones.

Thus, emulsifiable oil compositions will consist of from about 15 to 50 weight percent poly uracil, about 40 to 82 weight percent solvent, and about 1 to 10 weight percent emulsifier, as these terms are defined and used above.

Granules and pellets are physically stable, particulate compositions containing a poly uracil which adheres to or is distributed through a basic matrix of a coherent, inert carrier with macroscopic dimensions. In order to aid leaching of the poly uracil from the granule or pellet, a surfactant can be present.

For the compositions of this invention, the inert carrier is preferably of mineral origin, and the surfactant is a compound known to the art as a wetting agent.

There are two suitable types of carriers for the granule compositions containing compounds of the invention as an active material. The first are porous, absorptive, preformed granules, such as preformed and screened granular attapulgite or heat expanded, granular, screened vermiculite. On either of these, a suspension of the poly uracil can be sprayed and can be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent poly uracil, but more frequently a concentration of about 10 weight percent is desired for optimum distribution. Granular compositions are most useful in a size range of 15–30 mesh.

Thus, the preferred granular or pelleted formulations comprise about 5 to 30 weight percent poly uracil, about 0 to 5 weight percent wetting agent, and about 65 to 95 weight percent inert mineral carrier, as these terms are used herein.

The compositions of this invention exert herbicidal activity on a broad spectrum of plants. They are useful as general purpose weed killers or soil sterilants for control of vegetation on industrial sites and railroad ballast particularly in areas of high rainfall.

These compositions also exhibit selective herbicidal action in crops. By properly selecting a bis-uracil of the invention and a rate and time of application, weeds growing in such crops as blackberries, asparagus, sugar beets, mint, sisal, peaches, and sugar cane can be controlled.

The amount of bis-uracil herbicide to be used in any instance will be governed by such factors as climate, the type of weed to be controlled, soil conditions, and the like, and so it is not possible to give a rate of application suitable for all situations. Generally speaking, one uses the bis-uracils at levels of 0.25 to 8 pounds per acre for selective control in crops. Rates of 5 to 40 pounds per acre are satisfactory for general weed control.

The poly uracils of the invention uncouple in the presence of moist soil and therefore owe their herbicidal activity to the uracil herbicide components. It is believed that the poly uracils are uncoupled by hydrolytic action in the moist soil or by microbial breakdown under normal soil conditions capable of supporting weed growth, or both of these conditions.

The compositions of the invention therefore provide for the slow release of the active substituted uracils. Such compositions, which can be chemically tailored to release a highly active uracil at almost any desired rate, can have far-reaching practical advantages over the conventionl type of slow-release compositions which derive their release properties from a purely physical condition or form.

The following examples better illustrate the manner in which the compounds of this invention are formulated and used as herbicidal agents.

EXAMPLE 7

|  | Percent |
|---|---|
| 1,1'-carbonylbis(5-bromo - 3-sec-butyl - 6-methyluracil | 25.0 |
| Attapulgite clay | 69.5 |
| Synthetic silica | 2.0 |
| Dioctyl sodium sulfosuccinate | 2.0 |
| Sodium lignin sulfonate | 1.5 |

The above ingredients are blended, micropulverized to a particle size essentially below 50 microns and then reblended.

The above material is suspended in water at the rate of 20 pounds of active ingredient per 50 gallons of suspension.

This material is applied pre-emergence to areas in a tank farm at rates of 50 to 100 gallons per acre. The exact volume applied is predicated on the plant species to be controlled and the duration of control desired. Such weeds as crabgrass (Digitaria spp), barnyard grass (Echinochloa crusgalli), lamb's-quarter (Chenopodium album), dog fennel (Helenium tenuifolium), Johnson grass seedlings (Sorghum halepense), bluegrass (Poa spp.), wild garlic (Allium vineale), dock (Rumex spp.), peppergrass (Lepidium virginicum) and poison ivy seedlings (Rhus radicans) are controlled for an extended period.

All of the other compounds of the invention can be formulated and applied in like manner.

EXAMPLE 8

|  | Percent |
|---|---|
| 1,1'-oxalylbis(5-bromo - 3 - sec - butyl-6-methyluracil) | 80.0 |
| Montmorillonite clay | 14.5 |
| Synthetic silica | 2.0 |
| Sodium alkyl naphthalene sulfonate | 3.0 |
| Methylated cellulose | 0.5 |

The above ingredients are blended, micropulverized to a particle size essentially below 50 microns and then reblended.

The formulation is suspended in water to provide a ratio of 14 pounds of active ingredient in 50 gallons of water which is applied on one acre of a grass rhizome barrier strip encircling citrus orchards. The chemical is thoroughly incorporated by disking or rototilling to a depth of 8 inches within 2 hours after application. Control of torpedo grass (Panicum repens), Bermuda grass (Cynodon dactylon), Johnson grass (Sorghum halepense), and centipede grass (Eremochola ophiuroloes) is obtained. There is no injury to the citrus plants provided barrier strips are no closer to trees than 50 feet.

The following compounds can be formulated and applied in like manner:

1,1'-oxalylbis(3-isopropyl-5-bromo-6-methyluracil)
1,1'-oxalylbis(3-tert-butyl-5-chloro-6-methyluracil)
1,1'-oxalylbis[3-cyclohexyl-6,7-dihydro-5-cyclopenta(d) pyrimidine-2,4-(1H,3H)-dione]
1,1'-malonylbis(3-sec-butyl-5-bromo-6-methyluracil)
1,1'-terephthalylbis(3-sec-butyl-5-bromo-6-methyluracil)
1,1'-perhydroterephthalylbis(3-sec-butyl-5-bromo-6-methyluracil)
1,1'-oxalylbis(3-tert-butyl-5-bromo-6-methyluracil)

EXAMPLE 9

|  | Percent |
|---|---|
| 3 - tert - butyl-5-chloro-1-(5-bromo - 3 - tertbutyl-1,2,3,4-tetrahydro - 6 - methyl-2,4-dioxo-1-pyrimidinyl carbonyl)-6-methyluracil | 25 |
| Kaolinite | 69 |
| Calcium sulfate dihydrate | 2 |
| Nonyl phenyl polyethylene glycol ether | 3 |
| Sodium lignin sulfonate | 1 |

The above ingredients are blended, micropulverized to a particle size essentially below 50 microns and then reblended.

A 25% wettable powder formultaion is suspended in water and applied with a tractor mounted sprayer so that 2 to 4 lbs. of active ingredient is applied on one acre of asparagus in the spring before the spears emerge. Good control of lamb's quarter (Chenopodium album), ragweed (Ambrosit antemisifolia), mustard (Brassica nigra), chickweed (Stellaria media), crabgrass (Digitaria spp.) and goosegrass (Eleusine indica) is obtained through the cutting season. No crop injury is experienced.

The following compounds can be formulated and applied in like manner:

1,1'-(1-oxoethylene) bis-(5-bromo-3-sec-butyl-6-methyluracil)
1,1'-(1-oxo-2-methylethylen) bis-(5-chloro-3-tert butyl-6-methyluracil)

EXAMPLE 10

|  | Percent |
|---|---|
| 1,1' - oxalylbis(3-tert-butyl - 5 - chloro-6-methyluracil) | 5.0 |
| Calcium lignin sulfonate plus wood sugars | 9.7 |
| Dioctyl sodium sulfosuccinate | 0.3 |
| 15–30 mesh attapulgite | 85.0 |

The active material, the calcium lignin sulfonate plus wood sugars and the wetting agent are micropulverized to a particle size substantially less than 100 microns. This product is suspended in water and sprayed on the granules of attapulgite which are tumbled in a mixer. Following drying, the granules are ready for application.

Twenty pounds of the above granular formulation (equivalent to 4 lb./acre of active ingredient) are spread on an acre of Louisiana sugar cane in the spring just after off baring. Good control of crabgrass (Digitaria spp.), barnyard grass (Echinochloa crusgalli), mustard (Brassica spp.), chickweed (Stellaria media), lamb's-quarter (Chenopodium album), and Johnson grass (Sorghum halepense) seedlings is obtained with no significant injury to the crop.

EXAMPLE 11

| | Percent |
|---|---|
| 1,1' - phthalylbis[3-phenyl - 5,6,7,8 - tetrahydro-2,4-(1H,3H)-quinazolinedione] | 10 |
| Diatomaceous silica | 5 |
| Micaceous talc | 85 |

The above dust is prepared by blending and grinding the active material with the minor diluent, then blending the resulting powder with the major diluent.

The above dust formulation is applied with a dust blower to general weedy vegetation around the swampy edge of a pond so that 20 lbs. of active ingredient are applied on one acre. Good control of general weed species is obtained permitting a freer flow of water, and thus reducing areas of impounded water that provides breeding grounds for mosquitos.

EXAMPLE 12

| | Percent |
|---|---|
| 1,1'-oxalylbis(5-bromo-3-tert-butyl-6-methyluracil) | 10 |
| Sodium sulfate, anhydrous | 10 |
| Calcium lignin sulfonate | 5 |
| Kaolinite | 75 |

The above components are ground to pass a 50 mesh screen, moistened with water and extruded and cut to form pellets approximately 1/16 x 3/32 in size. The pellets are dried and can be used as such or can be further subdivided into granules in the 15–60 mesh range.

The above pellets or granules are applied with an auger spreader on railroad rights of way so that 20 lbs. of active ingredient are applied on one acre of actually treated area. Good control of foxtail (Setaria spp.), broomsedge (Andropogon virginicus), Bermuda grass (Cynodon dactylon), and marestail (Erigeron canadensis) is obtained.

EXAMPLE 13

| | Percent |
|---|---|
| 1,1' - sebacylbis(3 - sec - butyl - 5 - bromo-6-methyluracil) | 15 |
| Alkylaryl polyethylene glycol ether | 5 |
| Isophorone | 80 |

The above emulsifiable oil is prepared by mixing the components with agitation until a homogeneous solution results. The oil may be emulsified with water or extended with weed oil for application.

The formulation is extended with water or herbicidal oil in the proportion of 8 lbs. of active ingredient per 100 gallons of carrier and sprayed with a low pressure, large droplet forming sprayer on utility rights of ways. The general vegetation is sprayed thoroughly to wet both stems and foliage. Good control of maple (Acer spp.), Virginia pine (Pinus virginana), sweet gum (Liquidambar styraciflua), tulip poplar (Liriodendron tulipifera), broomsedge (Andropogon virginicus), mountain laurel (Kalmia latifolia), and poison ivy (Rhus radicans) is obtained.

EXAMPLE 14

| | Percent |
|---|---|
| 1,1' - carbonylbis(5 - bromo - 3-tert-butyl-6-methyluracil) | 25 |
| Sodium lauryl sulfate | 35 |
| Sodium lignin sulfonate | 2 |
| Attapulgite clay | 35 |
| Synthetic silica | 3 |

The above components are blended, micropulverized to a particle size below 50 microns and reblended.

A mixture is made with water using the formulation mentioned above to provide a concentrate of 8 lbs. of active ingredient in 50 gal. of carrier and is sprayed on one acre of blackberries. The spray mixture is directed toward the base of the plant on to freshly cultivated soil just prior to the time new leaves emerge in the canes in the spring. A repeat application of 4 lbs. per acre one month later provides full season weed control. Good control of chickweed (Stellaria media), henbit (Lamium amplexicaule), lamb's-quarter (Chenopodium album), field cress (Rorippa austriaca), wild mustard (Brassica spp.), crabgrass (Digitaria spp.) and goosegrass (Eleusine indica) is obtained.

EXAMPLE 15

| | Percent |
|---|---|
| 1,1'-carbonylbis(3-sec-butyl-5-chloro-6-ethyluracil) | 30 |
| Soya lecithin | 2 |
| Mineral oil | 63 |
| Sorbitan hexaoleate | 5 |

The above oil suspension is prepared by first grinding the active compound to pass a 40 mesh screen. All the components are then mixed and sand ground to a particle size substantially below 5 microns. The product is characterized by its extremely small particle size so that when diluted with weed oil or emulsified in water and sprayed, plant foliage is uniformly coated.

The above formulation is suspended in herbicidal oil to form a concentrated homogeneous suspension. The suspension containing 20 lbs. of active ingredient in 30 gallons of carrier is applied by high pressure sprayer mounted on a helicopter and distributed over one acre of area for firebreak maintenance. Good control of crabgrass (Digitaria spp.), foxtail (Setaria spp.), broomsedge (Andropogon virginicus), maple (Acer spp.) sprouts and mountain laurel (Kalmia latifolia) sprouts is obtained.

EXAMPLE 16

| | Percent |
|---|---|
| 1,1' - carbonylbis(5 - bromo-3-sec-butyl-6-methyluracil) | 97 |
| Alkylaryl polyethylene glycol ether | 3 |

The above components are blended and ground to pass a 20 mesh screen. This composition is suitable for further formulation or under some circumstances can be used directly as a granular material.

Without further alteration, this formulation is spread by hand or with a fertilizer spreader capable of distributing granules uniformly. Two pounds of the partially granulated mixture is spread evenly over 1,000 square feet of crushed rock, sand, gravel or ballast before applying an asphalt road surface. Good control of Bermuda grass (Cynodon dactylon), Johnson grass (Sorghum halepense) and torpedo grass (Panicum repens) is obtained.

I claim:
1. A herbicidal composition composed of an effective amount of a compound of the formula:

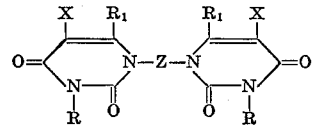

wherein
R is selected from the group consisting of alkyl of 3 through 8 carbon atoms, phenyl, benzyl, cycloalkyl of 5 through 8 carbon atoms, and substituted cycloalkyl of 5 through 8 carbon atoms wherein said substituent is selected from the group consisting of methyl and methoxy;

$R_1$ is alkyl of 1 through 3 carbon atoms;

X is selected from the group consisting of methyl, chlorine, bromine, and iodine with the proviso that X can be hydrogen when the R on the same ring is a cycloalkyl group, and with the further proviso that X can be joined with $R_1$ to form a trimethylene or tetramethylene bridge; and Z is selected from the group consisting of

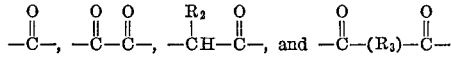

where
$R_2$ is hydrogen or alkyl of 1 through 4 carbon atoms and
$R_3$ is alkylene of 1 through 12 carbon atoms, alkenylene of 1 through 12 carbon atoms, cyclohexylene, or phenylene,
with a herbicidal adjuvant.

2. A herbicidal composition composed of an effective amount of a compound of the formula:

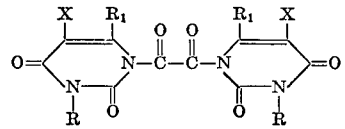

wherein
R is selected from the group consisting of alkyl of 3 through 8 carbon atoms, phenyl, benzyl, cycloalkyl of 5 through 8 carbon atoms, and substituted cycloalkyl of 5 through 8 carbon atoms wherein said substituent is selected from the group consisting of methyl and methoxy;

$R_1$ is alkyl of 1 through 3 carbon atoms; and

X is selected from the group consisting of methyl, chlorine, bromine, and iodine, with the proviso that X can be hydrogen when the R on the same ring is a cycloalkyl group, and with the further proviso that X can be joined with $R_1$ to form a trimethylene or tetramethylene bridge, with a herbicidal adjuvant.

3. A composition of claim 1 wherein the compound is 1,1'-oxalylbis(5-bromo-3-sec-butyl-6-methyluracil).
4. A composition of claim 1 wherein the compound is 1,1'-oxalylbis(5-bromo-3-tert-butyl-6-methyluracil).
5. A composition of claim 1 wherein the compound is 1,1'-oxalylbis[5-bromo-3-(3-pentyl)-6-methyluracil].
6. A composition of claim 1 wherein the compound is 1,1'-oxalylbis(3-sec-butyl-5-chloro-6-methyluracil).
7. A composition of claim 1 wherein the compound is 1,1'-oxalylbis(3-tert-butyl-5-chloro-6-methyluracil).
8. A composition of claim 1 wherein the compound is 1,1'-carbonylbis(5-bromo-3-sec-butyl-6-methyluracil).
9. A composition of claim 1 wherein the compound is 1,1'-carbonylbis(5-bromo-3-tert-butyl-6-methyluracil).
10. A composition of claim 1 wherein the compound is 1,1'-malonylbis(5-bromo-3-sec-butyl-6-methyluracil).

References Cited

UNITED STATES PATENTS

| | | | |
|---|---|---|---|
| 2,987,514 | 6/1961 | Hughes et al. | 71—92 |
| 2,987,515 | 6/1961 | Stromberg et al. | 71—92 |
| 2,987,521 | 6/1961 | Hughes et al. | 71—92 |
| 3,138,596 | 6/1964 | Kloosterman et al. | 260—260 |
| 3,235,360 | 2/1966 | Soboszenski | 71—92 |
| 3,235,363 | 2/1966 | Lockenbaugh et al. | 71—92 |
| 3,301,654 | 1/1967 | Dalton | 71—92 |

OTHER REFERENCES

Feldman, "Formaldehyde condensation of 6-aminouracils, (1961) CA 56, pp. 1736–37 (1962).

Bredereck et al., Catalytic action of tetraalkylureas etc., (1965) CA 62, p. 11807 (1965).

Novacek et al., Acylation of 6-azauracil etc., (1965), CA 63, pp. 13,382–83 (1965).

Ikehara et al., Polynucleotides, etc., (1965), CA 63, p. 13,381 (1965).

LEWIS GOTTS, Primary Examiner

G. HOLLRAH, Assistant Examiner

U.S. Cl. X.R.

260—260